(12) United States Patent
Day

(10) Patent No.: US 10,022,656 B2
(45) Date of Patent: Jul. 17, 2018

(54) FILTER PAD

(71) Applicant: Timothy Day, La Porte, TX (US)

(72) Inventor: Timothy Day, La Porte, TX (US)

(73) Assignee: Day Enterprises LLC, La Porte, TX (US)

( * ) Notice: Subject to any disclaimer, the term of this patent is extended or adjusted under 35 U.S.C. 154(b) by 0 days.

(21) Appl. No.: 15/590,080

(22) Filed: May 9, 2017

(65) Prior Publication Data

US 2017/0326480 A1    Nov. 16, 2017

Related U.S. Application Data

(60) Provisional application No. 62/334,080, filed on May 10, 2016.

(51) Int. Cl.
| B01D 35/027 | (2006.01) |
| C02F 11/12 | (2006.01) |
| B01D 29/96 | (2006.01) |
| B01D 29/27 | (2006.01) |
| B01D 29/05 | (2006.01) |

(52) U.S. Cl.
CPC ............ B01D 29/96 (2013.01); B01D 29/05 (2013.01); B01D 29/27 (2013.01); B01D 35/027 (2013.01); C02F 11/12 (2013.01); C02F 11/128 (2013.01); B01D 2201/24 (2013.01); B01D 2201/40 (2013.01)

(58) Field of Classification Search
None
See application file for complete search history.

(56) References Cited

U.S. PATENT DOCUMENTS

| 4,396,509 | A | 8/1983 | Foyn | |
| 4,929,353 | A * | 5/1990 | Harris | B01D 29/05 210/237 |
| 5,449,468 | A | 9/1995 | Trummel | |
| 5,507,859 | A | 8/1996 | Kaiser | |
| 6,146,528 | A | 11/2000 | Caughman et al. | |
| 6,221,120 | B1 | 4/2001 | Bennington et al. | |
| 6,258,268 | B1 | 7/2001 | Lake | |
| 6,709,578 | B2 | 3/2004 | Wilcher | |
| 7,045,068 | B2 | 5/2006 | Hutchinson et al. | |
| 7,240,681 | B2 | 7/2007 | Saik | |
| 7,581,647 | B2 | 9/2009 | Grichar et al. | |

(Continued)

OTHER PUBLICATIONS

Bucks Fabricating—Roll Off Containers webpage; www.bucksfab.com; Dec. 23, 2015.

(Continued)

*Primary Examiner* — Thomas M Lithgow
(74) *Attorney, Agent, or Firm* — FisherBroyles LLP; Anthony Dovale; Rachel Huffstetler

(57) ABSTRACT

A filter pad for use in a dewatering container is presented. The filter pad is configured to fit within the interior cavity and substantially line the interior surfaces. Material, which is usually liquids and slurries, is added to the container with the filter in place and gravity is used to filter the sediment, while the water is released through a release nozzle. The solids are retained in the filter pad for later disposal. The filter pad has a portion that can be selectively opened and is configured for placement substantially adjacent the door to permit selective egress of contents of the interior cavity.

12 Claims, 4 Drawing Sheets

(56) References Cited

U.S. PATENT DOCUMENTS

| | | |
|---|---|---|
| 7,820,045 B2 | 10/2010 | Caughman |
| 7,943,051 B2 | 5/2011 | Dieziger |
| 8,070,960 B2 | 12/2011 | Conwell |
| 2010/0294730 A1* | 11/2010 | Weston .................. B03B 9/063 210/767 |
| 2011/0056519 A1 | 3/2011 | Card et al. |

OTHER PUBLICATIONS

MHF Packaging Solutions Brochure; date unknown but at least as early as Jan. 25, 2016.
C.I.Agents Solutions webpage; www.ciagent.com/wastewater-dewatering-and-filtration/vault-sump-filters/; Dec. 23, 2015.
DePac Dewatering Liners and Filters, brochure, date unknown; presumed prior to May 10, 2016.
DePac Transliner Dispocable Container Liners, brochure, date unknown; presumed prior to May 10, 2016.
"City develops innovative solution of disposing of sewer residuals", Chuck Schroeder, Public Works 134.2, Feb. 2003.

* cited by examiner

FILTER PAD

CROSS REFERENCE TO RELATED APPLICATIONS

This application is a continuation of and claims the benefit of U.S. Provisional Pat. Application No. 62/334,080 filed May 10, 2016, the disclosure of which is hereby incorporated by reference.

FIELD OF THE INVENTION

The present invention relates generally to filter pads, most particularly for use in a filter pad that fits standard dewatering containers.

BACKGROUND OF THE INVENTION

Generally, filter pads are universal enough that they fit standard containers. Commonly, dewatering containers are based on a roll-away dumpster design, also known in the industry as roll-off containers. There are basically two varieties of these dewatering containers: those that have permanent filters and those that use disposable filters.

Container filters can be trailer-mounted for easy hauling, or permanently mounted on a tipping stand so that the cake can be unloaded on site. Within the permanent filter category there are multiple configurations of filter orientation, materials of construction, and filter porosity. The most common type of disposable filter is a needle punched polypropylene geotextile. This material is typically folded in half lengthwise and the ends sewn together creating an "envelope". It is then inserted into a container with the top edges folded over the top sides of the container.

The support structure for the disposable filters can be bar grating, expanded metal, perforated plate or other rigid porous material that can support the weight of the solids. These plates are set off of the sides and bottom so that liquids can drain from the material and then be decanted. There are usually drain ports in the container through which the effluent is discharged. These are typically placed on the bottom of the container or at the bottom of the door and have a shut off valve and safety cap. In rare cases, of a roll-off type disposable filter box, the door can simply be left slightly open (but secured with a latch).

Most often, dewatering boxes are used on a variety of waste streams and are allowed to gravity drain in whatever time frame was necessary to reach the desired cake dryness. Effluent water from a dewatering box can go back to the headworks of the plant virtually devoid of solids, or removed by a vacuum truck or similar means.

The main reason to choose a dewatering container is their simple operation. The dewatering container itself has no moving parts. The waste is processed in the same unit in which it is hauled away and dumped, thus limiting the handling of the sludge. The dewatering box will give volume reductions in the 80% to 95% liquid range depending on the percent solids in the sludge. The cake produced by the dewatering box will pass the "paint filter" test and can go to the local landfill. The effluent water from the dewatering box can go back to the headworks of the plant virtually devoid of solids.

To empty the container, the operator generally cuts the filter with a knife and dumps the content. The process is inefficient and sometimes dangerous. There is no way to control the solids dumping from the container as the operator cuts the pad. This places the operator in close proximity to the material and, in most cases, the operator contacts the solids as they dump.

Accordingly, it remains desirable in the pertinent art to provide filter pad to address the limitations associated with known filter pads, including but not limited to those limitations discussed above.

SUMMARY

Presented herein is a filter pad system for use in a dewatering container. A standard dewatering container has a bottom and a plurality of sides. The bottom and sides have interior surfaces that define an interior cavity. One of the sides of the container comprises a door to permit ingress and egress into the interior cavity.

In another aspect, there can be a filter pad configured to fit within the interior cavity and substantially line the interior surfaces. Filter pads, in general, are universal enough to fit in standard containers. The filter pad is generally slightly larger than the interior portion of the container to overlap the sidewalk. Pads are usually held in place by some sort of clips or duct tape, but any conventional fastening system is contemplated. This placement is usually done by the operator.

In an exemplified aspect, material, which is usually liquids and slurries, is added to the container with the filter in place and gravity is used to filter the sediment, while the water is released through a release nozzle. The solids are retained in the filter pad for later disposal. The filter pad has a portion that can be selectively opened and is configured for placement substantially adjacent the door to permit selective egress of contents of the interior cavity. This can be facilitated by having one or more separations defined in a portion of the filter pad adjacent the door, selectively closed by one or more fasteners. Extensions are advantageously provided to facilitated opening of the fasteners for content egress and are of a predetermined length and configuration enabling operation from distance, away from the content discharge. This allows the operator to stay out of harm's way and provide for off-loading of the solids. In effect, a win-win all the way around.

Related methods of operation are also provided. Other apparatuses, methods, systems, features, and advantages of the filter pads and the method of their use will be or become apparent to one with skill in the art upon examination of the following figures and detailed description. It is intended that all such additional apparatuses, methods, systems, features, and advantages be included within this description, be within the scope of the filter pads and the method of their use, and be protected by the accompanying claims.

DESCRIPTION OF THE INVENTION

Figure 1:
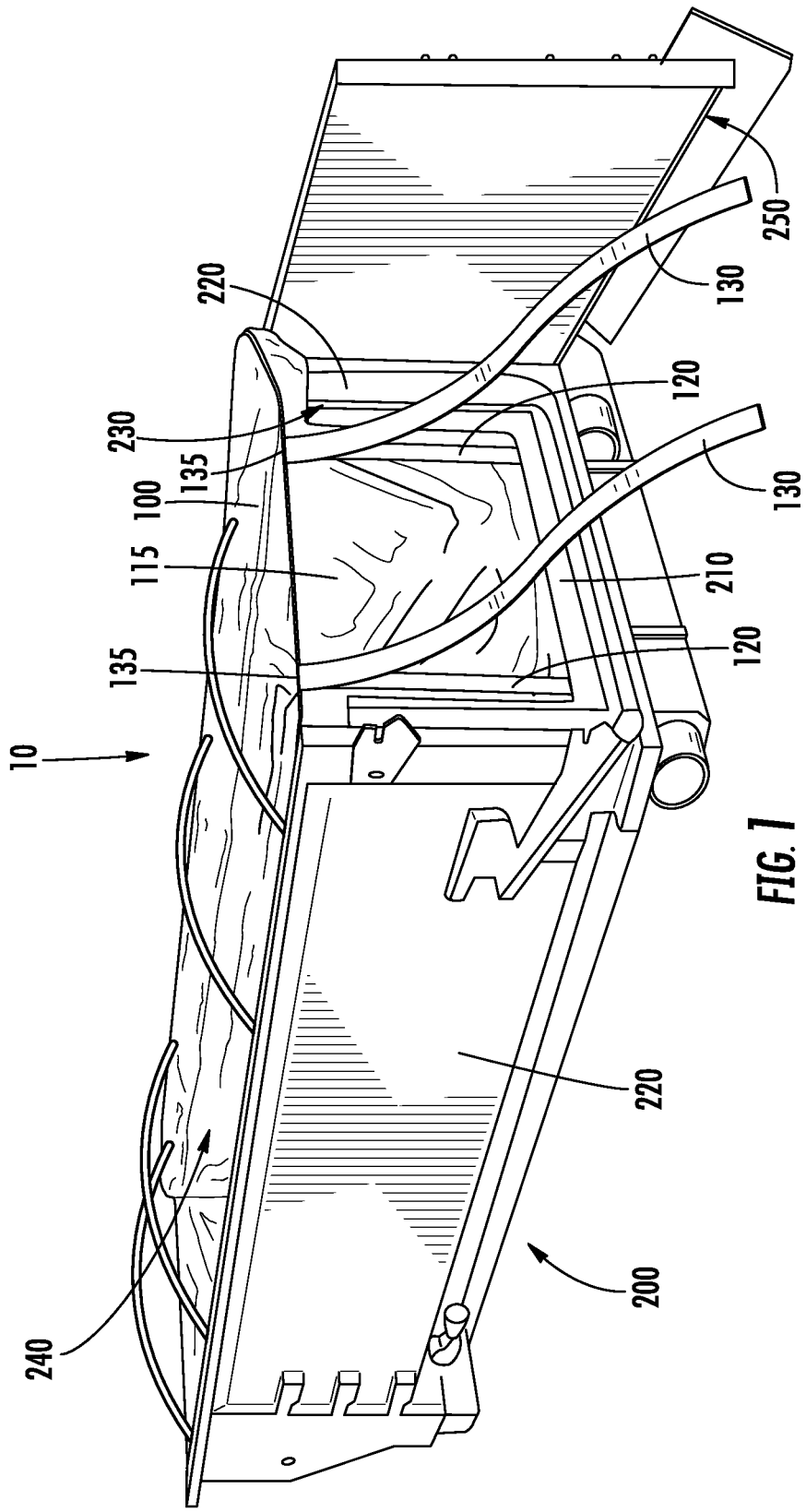
FIG. 1 is a perspective view of a prior art dewatering container.

The present invention can be understood more readily by reference to the following detailed description, examples, and claims, and their previous and following description. Before the present system, devices, and/or methods are disclosed and described, it is to be understood that this invention is not limited to the specific systems, devices, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. Those skilled in the relevant art will recognize that many changes can be made to the aspects described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "filter" includes aspects having two or more filters unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Terms used herein, such as "exemplary" or "exemplified," are not meant to show preference, but rather to explain that the aspect discussed thereafter is merely one example of the aspect presented.

The term "substantially," as used herein, may be applied to modify any quantitative representation which could permissibly vary without resulting in a change in the basic function to which it is related.

Additionally, descriptive terms, such as "first" or "second" do not necessarily connote plural referents. Alternatively, these terms are merely used to differentiate one object from another or to simply describe a single object. They are not necessarily to be considered in numerical order. For example, a "first object" could just as easily be named "object A" or the like.

Reference will now be made in detail to various embodiments of the present invention, examples of which are illustrated in the accompanying drawings. Wherever possible, the same reference numbers are used throughout the drawings to refer to the same or like parts.

In one aspect, presented herein is a filter pad system 10 for use with a dewatering container 200. A standard dewatering container 200 has a bottom 210 and a plurality of sides 220. The bottom and sides have interior surfaces 230 that define an interior cavity 240. One of the sides of the container comprises a door 250 to permit ingress and egress into the interior cavity. As shown, the container 200 and filter pad are generally rectangular, but container's and filter pads with other quadrilateral or non-quadilateral (for example, cylindrical) shapes may also be used for a filter pad system according to the present invention.

In another aspect, the filter pad system 10 comprises a filter pad 100 configured to fit within the interior cavity 240 and substantially line the interior surfaces 230. Filter pads, in general, are universal enough to fit in standard containers. The nominal size of containers are 21 feet in length, 8 feet wide, and 5 feet high. Of course, sizes can vary and not all containers are the same size. In an exemplified aspect, the container can be approximately 4', 6', or 8' in height. These sizes are merely examples and not meant to be limiting. The filter pad is generally slightly larger than the interior portion of the container in order to overlap the sidewalls. Pads are usually held in place by some sort of clips or duct tape, but any conventional fastening system is contemplated. This placement is usually done by the operator.

In an exemplified aspect, material, which is usually liquids and slurries, is added to the container with the filter in place and gravity is used to filter the sediment, while the water is released through a release nozzle. The solids are retained in the filter pad for later disposal. Occasionally, a vacuum or a pump can be used to assist the dewatering process. The filter pad can be, for example and not meant to be limiting, from about 100 to about 600 microns, referring to pore size. In another aspect, the filter pad can be from about 200 to about 500 microns. In yet another aspect, the filter pad can be from about 300 to about 400 microns. An exemplary material for forming the filter pad is PET (PolyEthylene Terephthalate), or the like. Of course, other materials, natural or engineered, may be selected.

In one aspect, the filter pad 100 has a portion that can be selectively opened and is configured for placement substantially adjacent the door to permit selective egress of contents of the interior cavity. This can be facilitated by having one or more separations 110 defined by an outer surface or opening surface 115 of the filter pad 100 adjacent the door 250, selectively closed by one or more fasteners 120. As shown, the door 250 and separations 110 are provided on a container 200 end surface but may be provided a side surface, or even a top or bottom surface for accommodating differently configured containers 200. The fasteners 120 can be, for example and not meant to be limiting, at least one zipper, hook and loop material, snaps, and the like. As shown, fasteners 120 are formed hook and loop mating material. The separations 110 can be positioned in a variety of manners for defining various panels forming the end surface 115. For instance, there can be separations running vertically along the side edges of the filter pad, along with a separation along the bottom edge, as in FIGS. 1, 4A and 4B for facilitating opening of the opening surface 115. There can also be a central vertical separation for defining more than one panel forming the end surface 115 and a bottom separation with overlapping side portions, as in FIGS. 2A and 2B. There may also be separations along a single side edges bottom, as in FIGS. 3A and 3B for opening of the surface 115 sideways. Other configurations are also contemplated.

It is also contemplated that, in one aspect, the filter pad can comprise one or more stiffeners adjacent the separations for stability or the panel portion adjacent the separations may be self-stiffening. The filter pad may be self-stiffening wherein a hem or material fold is providing along edges bordering the separations. Alternatively, the stiffeners can be inserted into the pad and can comprise plastic, cardboard, or other sufficiently rigid material.

In yet another aspect, the filter pad system also comprises at least one opening extension 130 attached to a portion of the filter pad to facilitate opening the portion of the filter pad from a distance to permit an operator to be out of the way of during egress of the contents of the interior cavity. The extension can be, for example and not meant to be limiting, fabric, a rope, chain, pole, or other device that extends one's reach. One or more extensions may be provided. A pair of extensions 130 are shown in the various figures and a single extension is shown in FIGS. 3A and 3B. The illustrated example of FIGS. 1, 2 and 4 include a pair of fore ends 135 secured to the end panel 115 at two locations, e.g., an upper and lower location, and an aft end for user manipulation.

Figure 4A:
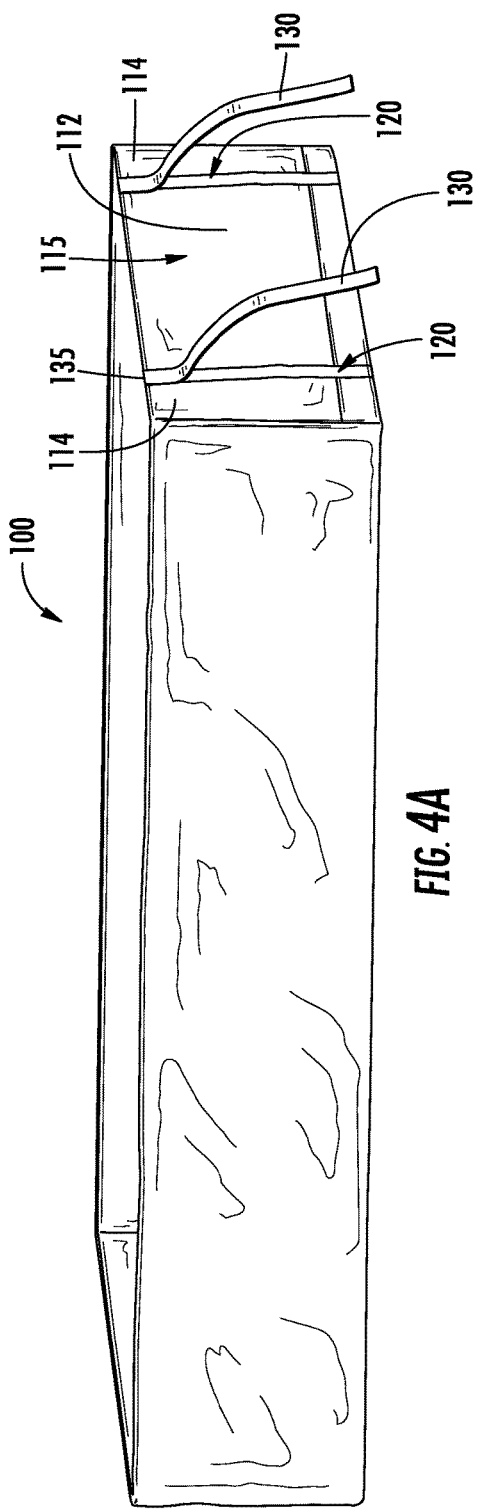
FIG. 4A is a perspective of a filter pad according to another aspect of the present invention.
Figure 4B:
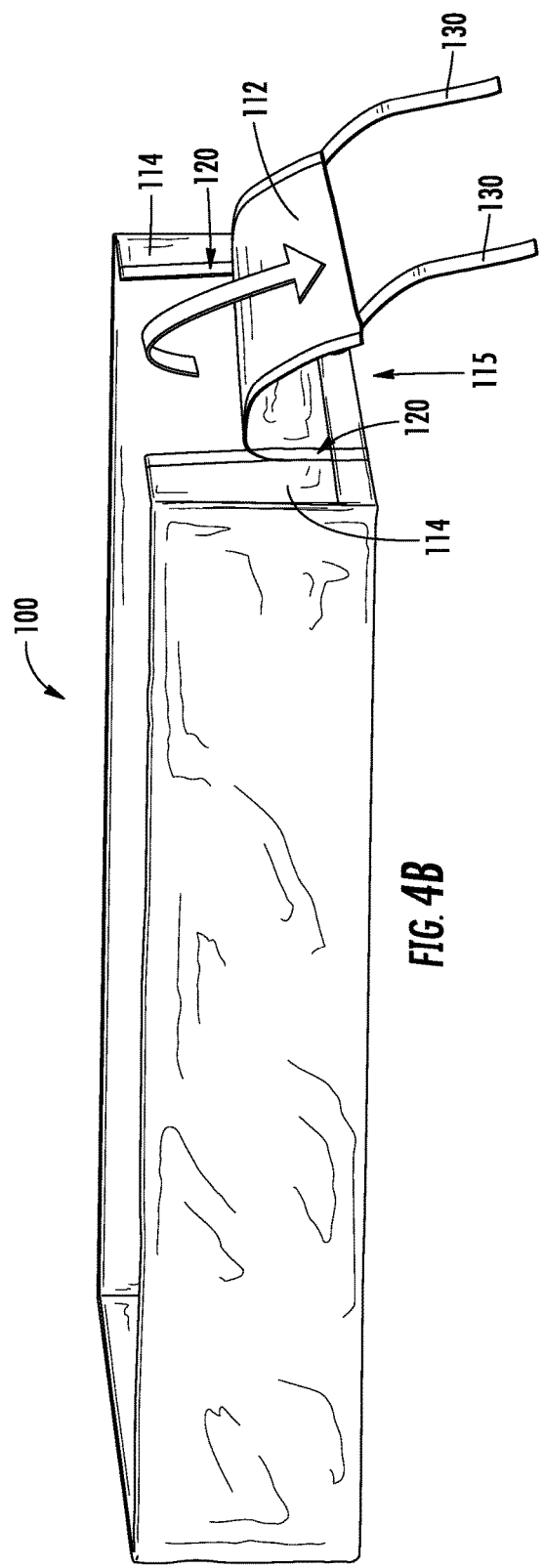
FIG. 4B is a perspective view of the filter pad of FIG. 4A in a partially opened position.

As shown in FIGS. 1, 4A and 4B, the extensions 130 are formed of strips of fabric. The fore ends 135 of the extensions 130 are secured to an area adjacent the open upper surface of end surface 115. The fore ends 135 may also be integrally formed with end surface 115 or secured thereto as shown. As shown, the extensions are positioned along the upper surface of end surface 115 and positioned laterally so as to co-extensive with the fasteners 120. As shown, the end surface includes a center panel 112 and two side panels 114. Fasteners 120 extend along or adjacent to longitudinal side edges of the center panel 112 and side panels 114. As shown, the center panel 112 extends in front of, or outwardly of, the side panels 112 but these may, of course, may be reversed.

In operation, the user may grasp the aft ends of extensions 130 and may be positioned away from the matter which will be dispensed from the interior cavity defined by the interior surfaces 230, whereby the distance will be substantially at least the predetermined length of the extensions 130. The user will exert forces, i.e., pull, the fore ends of extensions 130 thereby releasing the fasteners 120 and pulling the center panel 112 downward as shown in FIG. 4B.

Figure 2A:
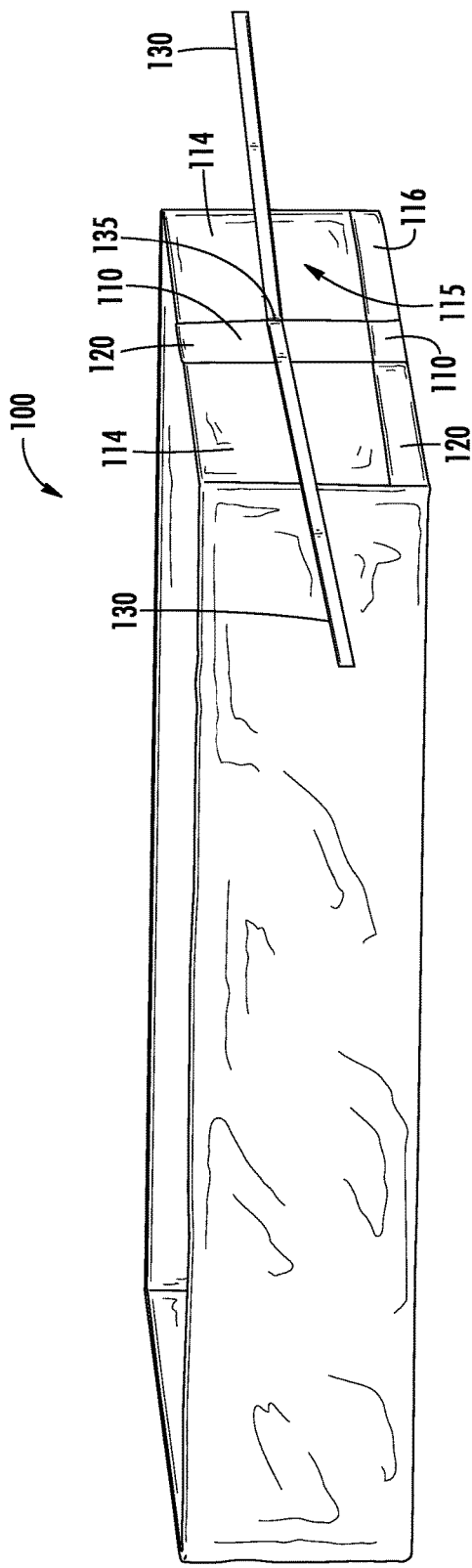
FIG. 2A is a perspective view of a filter pad according to one aspect of the present invention.
Figure 2B:
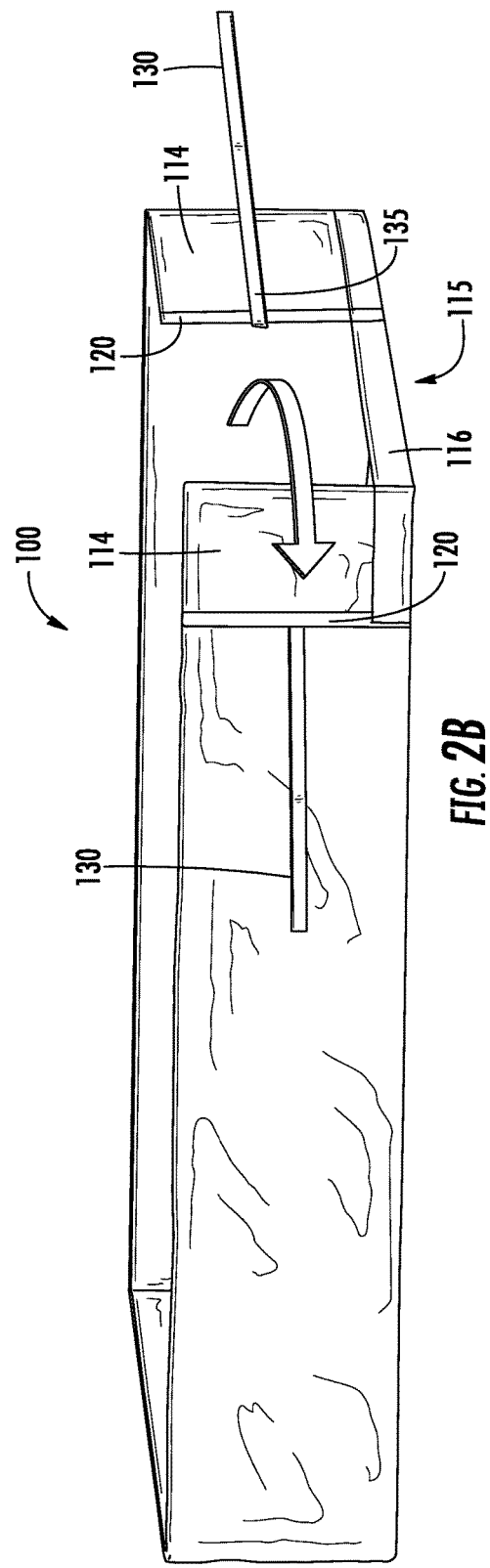
FIG. 2B is a perspective view of the filter pad of FIG. 2A in a partially opened position.
Figure 3A:
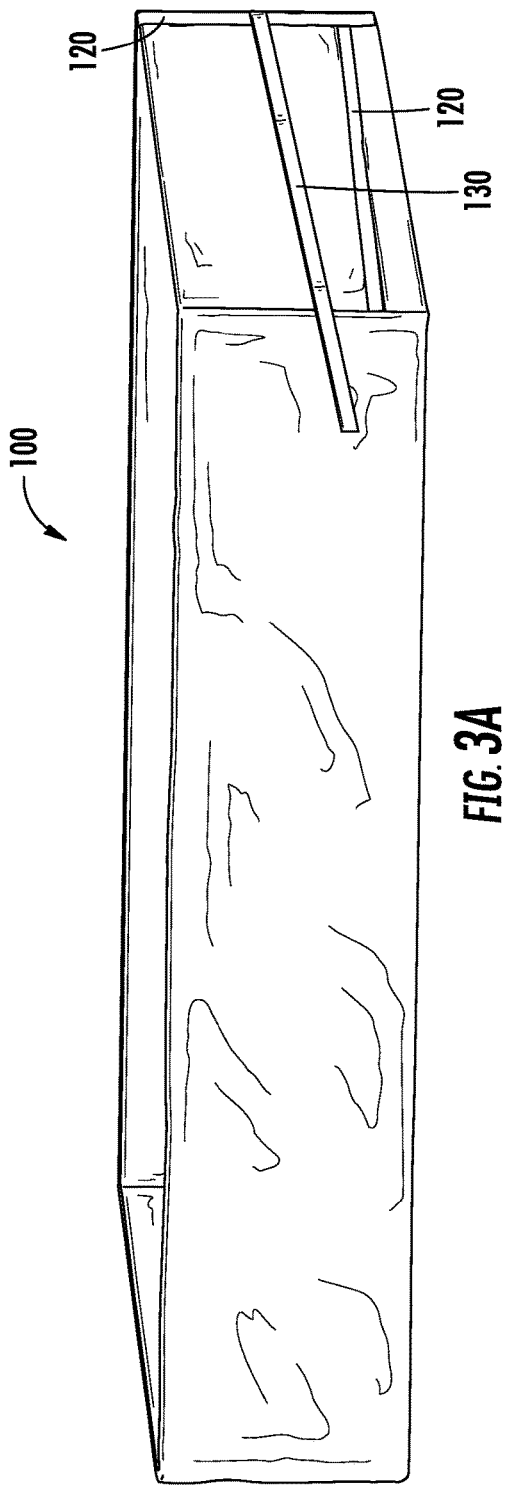
FIG. 3 is a perspective view of a filter pad according to another aspect of the present invention.
FIG. 3B is a perspective view of the filter pad of FIG. 3A in a partially opened position.
Figure 3B:
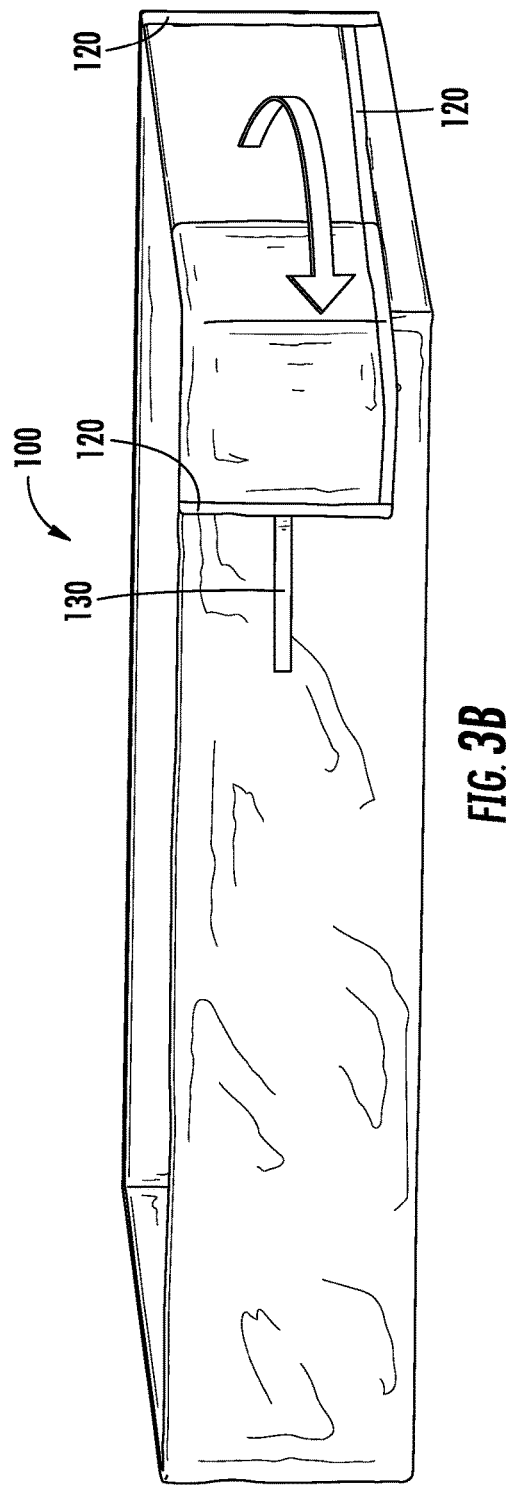

As shown in FIGS. 2A and 2B, according to this modified aspect of the present invention, the end surface 115 is differently configured. The end surface 115 comprises two side panels 114 and the extension fore ends 135 are secured to the longitudinal inwardly facing edge, i.e., adjacent the center of the end surface 115. Fasteners 120, such as hook and loop as shown, extend longitudinally along this edge. Fastener 120 also extends laterally, across the open bottom edges of the side panels 114 and bottom surface 116 of the end surface 115. As shown, left side panel 114 overlaps right side panel 114, but these may be reversed as is apparent.

In operation, the aft end of extension 130 of the front overlapping panel (as shown, the left panel 130) is pulled to release the fasteners 120, thereby opening the left side panel 114 and disengaging from the right-side panel 114. The right-side panel 114 may then be opened by pulling the right fastener 120 to disengage the laterally extending bottom fastener 120 on the bottom surface 116.

As shown in FIGS. 3A and 3B, according to this modified aspect of the invention, the end surface 115 is differently configured than the aforementioned end surfaces 115. The end surface 114 includes a single panel 112 having a longitudinally extending fastener 120 along one side edge and a laterally extending fastener 120 along its bottom edge. The extension 130 is secured at its fore end 135 to the side surface of the center panel 112, positioned laterally adjacent its midline. As shown, the center panel 112 may be opened from the left, but this may be reversed as is readily apparent.

In operation, the user would provide force to the aft end of the extension 130 thereby releasing the longitudinally extending fastener 120, initially, and then releasing the bottom fastener 120 to open the end surface 115 in a book page-like manner. As such, the user is removed a distance at least equal to the predetermined length of the extension 130 and is removed from the discharge of any contents within the interior cavity 240.

The extensions 130 may be formed integrally with the filter pad 100, or separately formed and secured thereto. The extensions 130 may be formed of the same or different material than the filter pad 100. Extensions 130 are provided of a predetermined length to facilitate safe opening of the filter pad end surface whereby the user may avoid contact with the content egress from the container 200 and filter pad 100. The extensions 130 have a predetermined length sufficient for the extension 130 to be pulled by the user from a safe distance. For example, the predetermined length in FIGS. 1 and 4 may be at least as long as the height of the center panel 115 or at least as long as the width of the side panel 114 or one of the side panela 114 of FIGS. 2 and 3, respectively.

The aforementioned aspects of the invention have heretofore been described and shown with an extension 130 which is generally linear. It is within the spirit and scope of the present invention, however, to provide other configurations such as an extension having a variable width, such as a triangular configuration as shown in the provisional application herein by reference.

Although several aspects of the invention have been disclosed in the foregoing specification, it is understood by those skilled in the art, that many modifications and other aspects of the invention will come to mind to which the invention pertains, having the benefit of the teaching presented in the foregoing description and associated drawings. It is thus understood that the invention is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and not for the purposes of limiting the described invention.

What is claimed is:

1. A filter pad for use with a dewatering container having a bottom and a plurality of sides, the bottom and sides having interior surfaces, wherein the interior surfaces define an interior cavity and wherein one of the sides comprises a door to permit ingress and egress into the interior cavity comprising:

a filter pad configured to fit within the interior cavity and substantially line the interior surfaces, the filter pad comprising an end surface configured to selectively open and positioned on said filter pad for placement substantially adjacent the door to permit selective egress of contents of the interior cavity;

said end surface comprising at least two separations defining at least one end panel and at least one extension having a fore end, said fore end being secured to said at least one end panel and a fastener for selectively securing said end panel in a closed position wherein at least one extension is positioned adjacent said separation whereby forces applied to said at least one extension releases said fastener and said end panel is moved from a closed to open position; and said at least one extension has a predetermined length sufficient for the extension to be pulled from a safe distance.

2. The filter pad according to claim 1, wherein the end panel comprises a center panel and at least one side panel and one of said at least two separations extends vertically, selectively closed by said fastener.

3. The filter pad according to claim 2, wherein the end panel comprises two vertically extending separations so as to define a center panel and two side panels.

4. The filter pad according to claim 3 wherein said at least one extension is positioned adjacent an upper portion of said center panel.

5. The filter pad according to claim 3 wherein said fastener is a plurality of fasteners which extend along vertical edges of said center panel and vertical edges of said side panels for cooperating with one another.

6. The filter pad according to claim 5 wherein said at least one extension is a pair of extensions positioned adjacent an open upper edge of said center panel and adjacent said fasteners.

7. The filter pad according to claim 1 wherein one of said at least two separations extends substantially horizontally along a bottom portion of said end panel and another of said at least one separations extends vertically adjacent a side of edge of said end panel so as to define an end panel which opens in a direction away from said vertically extending separation.

8. The filter pad according to claim 7 wherein said fastener is a plurality of fasteners which extend along edges of said end panel wherein a fastener extends vertically adjacent said vertically extending separation and a fastener extends horizontally adjacent said horizontally extending separation and said at least one extension is positioned adjacent said vertically extending fastener for opening said end panel horizontally.

9. The filter pad according to claim 7 wherein said end panel comprises a pair of side panels and said fastener is a plurality of fasteners extending vertically along vertical, inwardly facing edges of said side panels and horizontally along bottom edges of said side panels and said at least one extension is at least two extensions, each extending adjacent to said inwardly facing edges of said side panels to open said side panels in opposing directions.

10. The filter pad according to claim 1 wherein the fasteners comprise hook and loop material.

11. The filter pad according claim 3, wherein said predetermined extension length is at least substantially equal to the height of the center panel.

12. The filter pad according to claim 7, wherein said predetermined extension length is at least substantially equal to the longitudinal width of the end panel.

* * * * *